United States Patent
Wolf et al.

(10) Patent No.: US 12,122,226 B2
(45) Date of Patent: Oct. 22, 2024

(54) APPARATUS FOR THE HANDLING OF FLUIDS AND METHOD FOR THE MANUFACTURE OF SAME

(71) Applicant: Dr. Ing. h.c.F. Porsche Aktiengesellschaft, Stuttgart (DE)

(72) Inventors: Anton Wolf, Gelnhausen (DE); Florian Michaelis, Sinntal-Jossa (DE); Martin Gehring, Korb (DE); David Garcia Lazaro, Fellbach (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 1031 days.

(21) Appl. No.: 16/942,054

(22) Filed: Jul. 29, 2020

(65) Prior Publication Data

US 2020/0353811 A1   Nov. 12, 2020

Related U.S. Application Data

(63) Continuation of application No. PCT/EP2019/052142, filed on Jan. 29, 2019.

(30) Foreign Application Priority Data

Jan. 29, 2018   (DE) .................... 202018100479.4
Feb. 5, 2018    (DE) .................... 102018102542.4

(51) Int. Cl.
*B60K 11/02*    (2006.01)
*B60K 1/00*     (2006.01)

(52) U.S. Cl.
CPC ............ *B60K 11/02* (2013.01); *B60K 1/00* (2013.01); *B60K 2001/003* (2013.01)

(58) Field of Classification Search
CPC ..... B60K 1/00; B60K 2001/003; B60K 11/02
See application file for complete search history.

(56) References Cited

U.S. PATENT DOCUMENTS

| | | | |
|---|---|---|---|
| 5,896,834 A * | 4/1999 | Gruner ................ | F28D 9/0093 123/196 AB |
| 7,748,442 B2 * | 7/2010 | Kalbacher ............ | F01M 5/002 165/166 |

(Continued)

FOREIGN PATENT DOCUMENTS

| | | |
|---|---|---|
| CN | 2409364 Y | 12/2000 |
| CN | 101140014 A | 3/2008 |

(Continued)

OTHER PUBLICATIONS

International Search Report and Written Opinion of the International Search Authority mailed Jun. 7, 2019 in International Application No. PCT/EP2019/052142 (English and German languages) (11 pp.).

*Primary Examiner* — Eric S Ruppert
*Assistant Examiner* — Hans R Weiland
(74) *Attorney, Agent, or Firm* — LEYDIG, VOIT & MAYER, LTD.

(57) ABSTRACT

An apparatus handles at least one fluid in a vehicle, particularly an at least partly electric driven vehicle, comprising at least one essentially plate-shaped formed first distribution element and at least one second distribution element arranged essentially parallel to the first distribution element. The first distribution element and/or the second distribution element include at least one fluid handling element. The first distribution element and the second distribution element include plastics.

26 Claims, 8 Drawing Sheets

(56) References Cited

U.S. PATENT DOCUMENTS

| | | | |
|---|---|---|---|
| 9,540,055 B2 | 1/2017 | Berger et al. | |
| 10,196,964 B2* | 2/2019 | Braun | F02M 35/10268 |
| 10,473,402 B2* | 11/2019 | Coban | B01D 35/18 |
| 10,569,074 B2 | 2/2020 | Stenzel et al. | |
| 2003/0106679 A1* | 6/2003 | Brost | F28D 9/005 |
| | | | 165/154 |
| 2010/0206516 A1* | 8/2010 | Muller-Lufft | F01M 5/002 |
| | | | 165/96 |
| 2014/0020866 A1* | 1/2014 | Bluetling | F28F 9/0246 |
| | | | 165/104.19 |
| 2015/0129164 A1* | 5/2015 | Ollier | F28F 3/08 |
| | | | 165/166 |
| 2016/0355100 A1 | 12/2016 | Ito et al. | |
| 2016/0368373 A1 | 12/2016 | Dudar et al. | |
| 2017/0117571 A1* | 4/2017 | Sato | H01M 8/2475 |
| 2017/0256762 A1* | 9/2017 | Naito | B60K 1/00 |
| 2017/0373359 A1 | 12/2017 | Krull et al. | |

FOREIGN PATENT DOCUMENTS

| | | |
|---|---|---|
| CN | 202125527 U | 1/2012 |
| CN | 205001051 U | 1/2016 |
| CN | 107029344 A | 8/2017 |
| DE | 10 2012 211 431 A1 | 1/2014 |
| WO | WO 2013/004935 A2 | 1/2013 |

* cited by examiner

APPARATUS FOR THE HANDLING OF FLUIDS AND METHOD FOR THE MANUFACTURE OF SAME

PRIORITY

This application is a continuation application of International PCT Patent Application No. PCT/EP2019/052142 filed on Jan. 29, 2019, entitled "DEVICE FOR MANAGING FLUIDS, AND METHODS FOR THE PRODUCTION THEREOF," which claims priority to German Patent Application No. 20 2018 100 479.4 filed on Jan. 29, 2018 and German Patent Application No. 10 2018 102 542.4 filed Feb. 5, 2018, the entire contents of each of which are herein incorporated by reference.

TECHNICAL FIELD

The present invention relates to an apparatus for the handling of at least one fluid in a vehicle.

BACKGROUND

Such apparatuses are known from prior art for vehicles with combustion engines in the shape of systems that are used for thermo management. In these modules, a cooling medium, such as cooling water, is employed. These systems in vehicles with combustion engines are, however, comparably simple and in general built decentrally. The installation space available for these systems is sufficient for receiving the fluid handling elements, such as control elements, for example valves, pumps and sensors.

In modern vehicles that comprise an electric drive, particularly as additional drive source in hybrid vehicles, it is, however, problematic that the available installation space is reduced due to the volume occupied by energy storages and further elements, such as electromotors and control electronics, compared to the respective elements in vehicles that only have a combustion motor. At the same time, the number of heat sources, such as energy storages and electric motors and also control electronics and inverters and such, to be cooled, is increased, whereby the complexity of the thermo management system increases, which automatically leads to an exponentially increasing installation space needed due to the increased number of fluid handling elements. Therefore, the number of necessarily fluid handling elements for connecting the circuits among each other is not linear to the number of circuits, but exponential. Furthermore, the weight of the systems increases due to the increased number of tubings. Thus, an increased installation space and increased total weight is necessary for these systems, which has a negative effect on the consumption of the vehicles. Also, such complex systems lead to a significant deceleration of the production process of the vehicle. The respective mechanic has to take care of the correct connection of the plurality of tubings with the respective components and fluid handling elements in the production and has to check the seal tightness of the connections. This reduces the cycle rate in the production process.

SUMMARY

It is therefore one objective of the present invention to further develop the apparatuses known from the prior art in such a way that the disadvantages of the prior art are overcome, particularly that the necessary installation space for the apparatus and the total weight is reduced and at the same time the production process of the vehicle, particularly hybrid vehicles and/or battery-driven vehicles (battery electric vehicles (BEV)) is simplified while at the same time increasing the reliability.

This objective is solved according to one embodiment by an apparatus for the handling of at least one fluid in a vehicle, particularly an at least partly electrically-driven vehicle, comprising at least one essentially plate-shaped first distribution element and at least one second distribution element, arranged essentially parallel to the first distribution element, wherein the first distribution element and/or the second distribution element at least region-wisely comprises at least one fluid handling element and wherein the first distribution element and the second distribution element comprises plastics at least region-wisely.

One embodiment further suggests that a plurality of fluid handling elements is present.

The apparatus comprises at least one, or a plurality, of third distribution elements, wherein the third distribution element(s) is/are arranged particularly parallel to the first distribution element and/or the fluid handling element(s) and or the fluid handling element and/or at least one of the fluid handling elements.

The apparatus according to one embodiment can further be characterized in that the fluid handling element and/or at least one of the fluid handling elements comprises at least one opening, at least one connection nozzle, particularly in the shape at least one inlet and/or outlet, at least one valve, at least one pump, at least one channel, at least one sensor and/or at least one sealing element.

Regarding the aforementioned apparatus the fluid handling element and/or at least one of the fluid handling elements is completely encompassed by the first distribution element, the second distribution element and/or the third distribution element, at least a part of the fluid handling element and/or at least one of the fluid handling elements is formed integrally, as 2K component in the first distribution element, in the second distribution element and/or the third distribution element, particularly in the shape of at least one recess and/or at least one chamber, such as at least one valve chamber, at least one pump chamber, at least one channel segment, such as a channel part shell, particularly a channel half shell, at least one sensing chamber and/or at least one sample chamber and/or the fluid handling element comprises an auxiliary element being connectable to the first distribution element, the second distribution element and/or the third distribution element, particularly being receivable and/or arrangeable at least region-wisely in the recess and/or the chamber, and/or an auxiliary element such as a valve actuator, a pump actuator, a valve member, a pump element, a sensor, such as a temperature sensor, a pH sensor, a pressure sensor and/or a flow sensor.

It is further suggested that at least one region of the auxiliary element is acoustically uncoupled and/or acoustically damped from the first distribution element, the second distribution element and/or the third distribution element, being supported by interposing at least one acoustic first damping element at the first distribution element, the second distribution element and/or the third distribution element.

For the aforementioned embodiment, the auxiliary element is built up of at least two parts, wherein particularly the first part is supported acoustically uncoupled and/or acoustically damped from the first distribution element, the second distribution element and/or the third distribution element, whereas the second part is connected with the first distribution element, the second distribution element and/or the third distribution element indirectly acoustically undamped.

It is also suggested that the first part comprises at least one drive, at least one actuator and/or at least one analysis unit and/or transducer of a sensor, particularly for transducing a sensing signal captured by a sensing unit of the sensor into a measurement signal output by the sensor.

According to one embodiment, both of the aforementioned embodiments can be characterized in that the second part comprises at least one member, such as a pump member and/or a valve member and/or at least one sensing unit of the sensor cooperating with the analysis unit and/or the transducer unit, being driven by the first part, particularly by the drive and/or the actuator.

According to one embodiment, a force, such as a translatory force and/or a torque, is transferable from at least one region of the first part to at least one region of the second part and/or at least partly the sensing signal by at least one coupling fixture, particularly by an electromagnetic, magnetic, elastic mechanic, direct mechanic, indirect and/or optical coupling.

It is hereby suggested that the coupling fixture comprises at least one magnet and/or at least one second damping element and/or the coupling fixture is at least section-wise permeable for the fluid handled by the apparatus, particularly for transferring the fluid from the second part to the first part or from the first part to the second part, for example, comprises at least section-wise a hollow shaft and/or a fluid lead and/or being formed as hollow shaft.

Furthermore, the apparatus according to one embodiment can be characterized in that the first damping element and/or the second damping element comprise(s) an elastic element, such as a spring and/or a rubber element.

It is thereby also suggested that at least one fluid channel, at least one valve chamber, at least one pump chamber is formed at least partly by a combination of the first distribution element and the second distribution element, the second distribution element and the third distribution element, the first distribution element and the third distribution element and/or the first of the third distribution element and a second of the third distribution element.

The apparatus according to one embodiment can be characterized in that the first distribution element and the second distribution element, the first distribution element and the third distribution element, the second distribution element and the third distribution element and/or at least two third distribution elements are connected to each other via at least one first connection fixture not destructive-freely detachably.

At least one auxiliary element is connected to the first distribution element, the second distribution element and/or the third distribution element at least region-wisely by at least one second connection fixture.

For the two aforementioned embodiments, it is suggested according to one embodiment that the first connection fixture and/or the second connection fixture comprise(s) at least one welded joint, at least one adhesion connection, at least one screw connection, at least one lock connection and/or at least one clip connection.

Regarding the two aforementioned embodiments the first part of the auxiliary element is connected by a first second connection fixture and at least the second part of the auxiliary element is connected by at least one second connection fixture.

It is hereby suggested that the first second connection fixture comprises the first damping element at least section-wisely.

An apparatus according to one embodiment can also be characterized in that the first connection element, the second connection element and/or the third connection element comprises at least region-wisely a thermoplastic material, a duroplastic material, a compound material, such as a thermoplastic and duroplastic compound material, at least one polypropylene material and/or at least one polyamide material.

Subsequently, it is suggested for the apparatus according to one embodiment that the fluid comprises at least one liquid, such as a cooling liquid, particularly comprises water, for example distilled water.

Furthermore, one embodiment provides a method for the production of an apparatus for the handling of at least one fluid, particularly an apparatus according to one embodiment, comprising the steps provision of at least one first, essentially plate-shaped distribution element, provision of at least one second, essentially plate-shaped distribution element and connection of the first distribution element to the second distribution element by at least one first connection fixture.

The method further comprises the provision of at least one third, essentially plate-shaped distribution element, such as a plurality of third distribution elements, wherein at least one third distribution element is connected to the first distribution element, the second distribution element and/or at least one further third distribution element by the first connection fixture.

It is also suggested for the method that the step for the provision of the first distribution element, the step of the provision of the second distribution element and/or the step of the provision of the third distribution element comprises the manufacture of the first, second and/or third distribution element in at least open/closed tool, particularly by injection molding.

It can also be provided that the step of the provision of the first distribution element, the step of the provision of the second distribution element and/or the step of the provision of the third distribution element comprises at least partly the formation of at least one fluid handling element in the first, second and/or third distribution element, particularly in a 2K process.

One embodiment is therefore based on the surprising understanding that it is possible that the functions necessary for a thermo management in a vehicle, particularly a hybrid vehicle and/or BEV, can be unified in an apparatus according to one embodiment in the shape of a thermo management module that can also be denoted as valve block. This module can adopt all cooling and heating functions of the drive components in the vehicle, i.e. electric power unit, high-voltage battery, power electronics and interior heating. The apparatus according to one embodiment provides the advantage that the installation space necessary for the thermo management can be significantly reduced and compared to the systems of the prior art, where up to 40 tubes need to be connected correctly at the production line of the vehicle, only one module needs to be built into the car and needs to be connected to a minor number of tubes. It is thereby possible that the cycle time during the manufacture of the vehicle can be kept by achieving high function integration into one module equipped with all components, which can be provided as seal tightness-approved component at the production line of the vehicle.

Since the apparatus according to one embodiment can also be formed as plastic module, also the component weight is reduced and at the same time the variability is increased, since the employment of plastic materials facilitates a change of the component geometry by simple adaption of the few complex tools. It is hereby beneficial that the apparatus is built up modularly.

Various possibilities for the interconnection of fluid handling elements and the guiding of fluids in the module from an entrance and inlet, respectively, to an exit and outlet, respectively and from fluid handling element to fluid handling element, respectively. Each of the distribution elements forms a layer and level, respectively, in which the fluid is guided in different channels in the respective level. By the connection of the respective levels, it is for example also possible that the fluid can be guided from one level to an adjacent level in order to be guided there from a first position of the first level to a different position of the first level and being fed in there into the first level. Furthermore, in the further level further fluid handling elements, such as pumps or valves and outlets or inlets can be provided. Also, channels can be formed in the connection section of levels, wherein the channels can be formed by recesses formed in the surfaces of adjacent levels and distribution elements, respectively. By the combination of a first distribution element with different further distribution elements, the channel cross-section can be adapted arbitrarily, in that the cross-section shape of a recess is varied in the further distribution element. The arrangement of connector elements to the direction from which the tubing of the vehicles needs to be connected to can be adapted due to the modular setup. The respective distribution element can be adapted in such a way that it has connectors at its front and/or at its main side.

A plate-shaped forming of the distribution elements is understood in such a way that the extension of the distribution element is larger in a level, in which it is connected towards a further distribution element, is larger than the extension in the direction perpendicular to this level. The plate-shaped formation of the distribution elements offers the advantage that the contact face between the distribution elements is maximized and thereby a best-possible connection and thereby sealing between the same can be achieved. By this maximization it is further achieved that a greatest possible surface for interfaces for the transmission of the fluid from one level to another level is provided and thereby a greatest possible modularity can be achieved.

Similar to a microchip, where the circuits can be arranged in several levels, the functionality of the apparatus according to one embodiment can be supplemented nearly in any manner, by increasing the number of distribution elements arranged parallel, that means layer-wise, i.e. the number of layers and levels, respectively, being increased. It is thereby possible to provide a thermo management also for vehicles that have an increased number of components to be cooled or heated, respectively, with the fluid by adding additional levels.

The modularity of the apparatus is also increased in that the single fluid handling elements are only partly formed by the distribution elements and only formed by the combination of the auxiliary elements. This makes it possible that the same region of a distribution element that partly forms a respective fluid handling element can be combined with different auxiliary elements according to the need and requirements and thereby be formed with different characteristics, such as switching velocities of valves, pump performance of pumps or durability against different temperatures.

Particularly, a two-part embodiment of auxiliary elements further facilitates that the acoustic properties of the thermo management system and module, respectively, can be improved. Thereby, the single parts can be uncoupled in acoustic and/or mechanical manner, and it can be inhibited that impact sound vibrations from a drive or actuator to the distribution elements comprising main body can occur. This would otherwise lead to the fact that the main body acts as resonator and thereby an amplification of the impact sound occurs.

At the same time, also the functionality of the fluid handling elements is assured. Due to the partial arrangement of the auxiliary elements in the first distribution element, the second distribution element and/or the third distribution element and of the at least partial extension of the auxiliary element across the first distribution element, the second distribution element and/or the third distribution element, it is important for its functionality that the respective gap sizes are met. As an example, in case of a valve or a pump as auxiliary element, it must be assured that a transfer element stretching from a drive or an actuator to a valve or pump, such as a shaft, has sufficient distance to a respective distribution element in order to avoid grinding or such. Further, for the case of a bearing of the shaft at the respective distribution element, overloading the bearings needs to be avoided.

It also needs to be assured that the valve and pump member, respectively, has a defined position in the respective pump chamber and valve chamber, respectively, formed in the respective distribution element, in order to assure a desired pump performance and valve function, respectively. Therefore, respective gap sizes around the valve member need to be meet in a valve in order to achieve a sealing.

If the entire auxiliary element would be supported at the respective distribution element, for example by an elastic bearing, particularly by employing the first damping element, in an acoustically decoupled manner together with the transfer element and the respective valve and pump member, respectively, the respective gap sizes could not be met and the functionality could not be assured.

By the two-part embodiment of the auxiliary element, it is now possible to support the part of the auxiliary element generating the impact sound, such as the drive of the pump and the actuator valve, respectively, in an acoustically decoupled manner from the respective distribution element, on which it is mounted, without negatively influencing the functionality of the auxiliary element.

The functionality of the auxiliary element is thereby ensured in that the second part of the auxiliary element is mounted undamped at the respective distribution element and thereby to assure a defined position of the second part of the auxiliary element relative to the distribution element, particularly keeping the desired gap sizes.

In order to assure a transfer of movements and forces, such as torques from the first part to the second part, particularly from a drive and actuator, respectively of the auxiliary element to the valve or pump member of the auxiliary element, however, without generating acoustic bridges, a connection via the coupling arrangement is provided. This particularly allows a contactless force transfer, for example via a magnet interaction, or a damped transfer, for example via the second damping element, in that it is assured that the main body does not serve as a resonator or amplifier for the impact sound generated by the drive or the actuator.

The contactless force transfer can for example take place in that the drive moves a first magnet, which is arranged adjacent, but distanced to an end of the transfer element, a further magnet or an element influenceable by the first magnet is arranged in the region of the end of the transfer element so that the transfer element can follow the movement of the first magnet.

In the second embodiment of the auxiliary element, it is still possible to achieve a direct, particularly mechanical elastic, and/or indirect mechanical coupling between the parts, despite an acoustic decoupling. Furthermore, further types of coupling between the parts of the auxiliary elements are possible. Thus, the parts can be mechanically decoupled; however, a signal transfer between these should still be possible. Therefore, the second part can comprise a sensing element and the signal generated by the sensing element can be transmitted contactless, for example electromagnetically or optically, to the first part in that the sensing signal is converted to a measurement signal for a subsequent analysis. The conversion can also take place in the second part and the measurement signal can then be transmitted to the first part.

A different kind of transmission between the first part and the second part can take place independently from the decoupling between the first and the second part. The coupling apparatus can also facilitate a transmission of fluid handled by the apparatus, in particular in the distribution elements, between the parts. It is for example conceivable that the coupling apparatus comprises a fluid lead and/or a hollow shaft. It is then possible to transport fluid from the second element to the first element, particularly for cooling or heating purposes. The first part can comprise a drive to be cooled or to be heated, particularly a pump and/or valve drive and the fluid can be guided via the second part, such as a pump member, pump wheel, pump rotor and/or valve member to the first part. After passing the first part, the fluid can be led via a further lead into the coupling apparatus or an external, from the auxiliary element to the fluid handling element, such as an inlet, and again be fed to the respective distribution element. This transfer of fluid can also be achieved when the parts of the auxiliary element and/or the coupling apparatus are at least functionally separated, but otherwise formed at least region-wisely one-pieced.

The application of plastic materials further offers the advantage that the distribution elements can be connected to each other in various manners. Thus, the same can be welded, glued or screwed together according to the requirements. It is thereby particularly advantageous that possibly necessary sealing elements can be integrated directly during the production of the distribution elements, for example in a 2K process. A 2K process in the context of this invention can be taken to mean that in the course of a work step, several plastic material components are processed together, particularly connected. This is for example possible by an injection molding process.

In an exemplary embodiment of the apparatus according to one embodiment, the at least one fluid handling element is a pump with an essentially cylinder-shaped pump housing that comprises a housing sheath and two housing face walls opposing each other and delimiting the housing sheath. The pump can for example be arranged evenly on one of the distribution elements by an essentially circular housing face wall. As an example, the distribution element has a pan formed essentially complementary to the pump housing, wherein the pan is to be inserted in the pump. According to a further exemplary embodiment, the pump is arranged lyingly on the distribution element. It can be provided that a circular section-shaped pan is formed at the surface of the distribution element for receiving at least a part of the cylinder-shaped housing sheath. The fixture of the pump to the distribution element can for example take place by a clamp. The same can encompass the pump at least partly along the circumference and be mounted, such as screwed, glued or form-fittingly fixed, particularly locked, to the distribution element.

According to a further development of the present invention, it can be provided all fluid guiding channels and fluid handling elements are positioned on the same level, particularly, in a connection level of the at least two distribution elements, on the welding level. As described above, it can be necessary for example for reasons of space to provide several levels for the fluid guiding and fluid handling in order to assure an efficient distribution of the fluid.

In an exemplary embodiment of the apparatus according to one embodiment, the fluid handling element is a coolant-coolant heat transfer unit, the so-called chiller. The same can for example be coupled to a distribution element by a for example U-shaped profile, made of plastics. As an example, the coupling can take place form-fittingly, such as by locking, by screwing our firmly bondedly, such as by gluing or welding.

According to an exemplary further development, the at least one connection nozzle, particularly at least one inlet and/or at least one outlet can be formed for being connected to a respective component, such as a fluid handling element, in such a way that an assembly direction and/or orientation for the coupling with the further component is predetermined. For example, the connection nozzle has a coupling fixture, such as a coupling part designed to engage with a respective coupling fixture, such as a male coupling part, which is to be mounted to the further component to be coupled, or vice-versa, wherein the coupling fixture of the connection nozzle defines a predetermined assembly direction and/or orientation, in which the component is couplable. In particular, the coupling parts of the connection nozzle and the components can only engage with each other in the predetermined assembly direction and/or orientation to each other. For the case that several connection nozzles can be arranged for several components at the distribution elements, the coupling parts can be designed in such a way that an unambiguous assignment of the coupling parts to be fixed to one another is possible, hence, a respective coupling part pair is unambiguously determinable. In particular, the risk of a faulty installation can be significantly reduced, and/or avoided.

As a summary, one embodiment offers an apparatus for the handling of a fluid and a method for the production of the same is described, where the apparatus can be used as a thermo management module, namely also in conventional vehicles exclusively driven with a combustion engine and not only for hybrid or electric vehicles, where the module has a highest function integration and a minimum of tubing. Furthermore, a package advantage is achieved, that means the installation space is minimized and a greatest possible adaptability and flexibility is achieved by the modular setup. In particular, this leads to a cost benefit, both for the production of the apparatus and also for the production of the vehicle, in which the apparatus is used so that the cycle rate can be increased, since an assembly component (ZSB) can be mounted to the vehicle instead of single components.

BRIEF DESCRIPTION OF THE DRAWINGS

Further features and advantages of one embodiment become apparent from the subsequent description, in which embodiments are outlined by schematic drawings.

They show.

DETAILED DESCRIPTION

Figure 1:
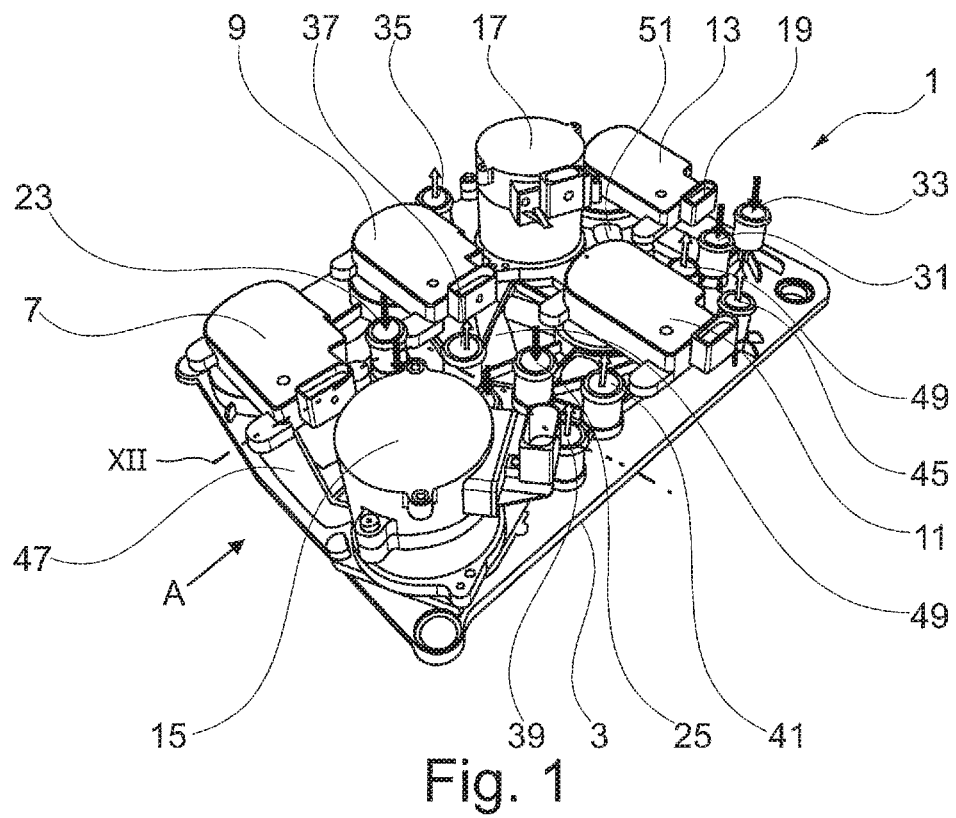
FIG. 1 a perspective view on the upper side of an apparatus according to one embodiment.
Figure 2:
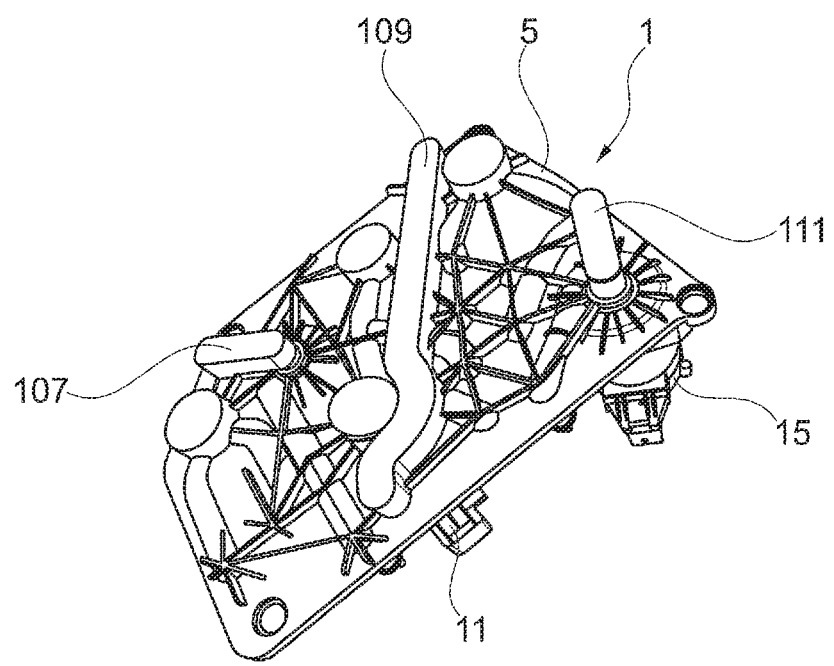
FIG. 2 a perspective view to the bottom side of the apparatus of FIG. 1.
Figure 3:
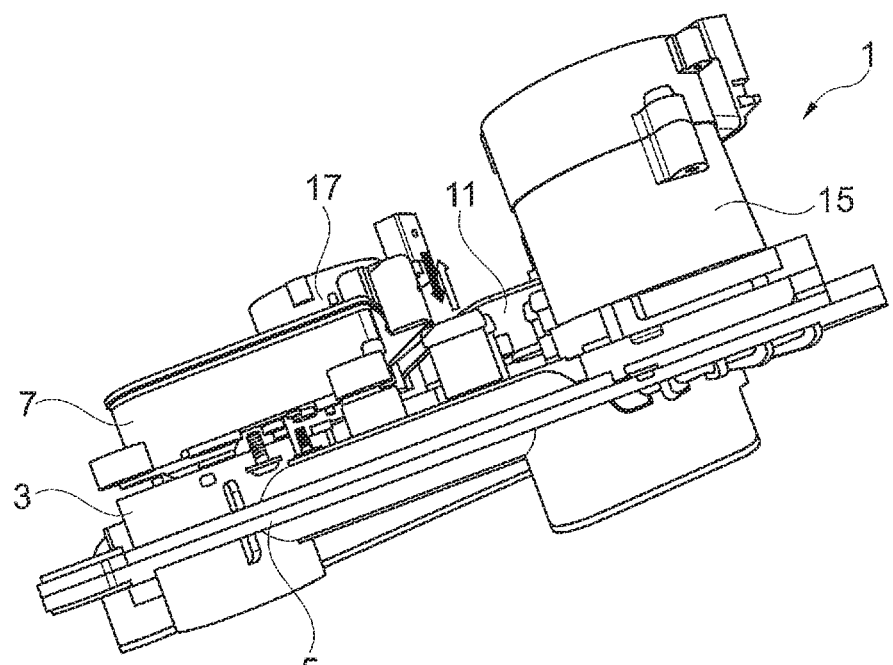
FIG. 3 a perspective view of the apparatus of FIGS. 1 and 2 from the direction A in FIG. 1.

FIGS. 1 to 3 show the different use to an apparatus according to one embodiment in the shape of a module 1 for the thermo management of an electric vehicle.

The module 1 comprises in this example a first distribution element 3 and a second distribution element 5. The module further comprises a plurality of fluid handling elements in the shape of electromotoric valves 7, 9, 11, and 13, pumps 15, 17, sensors 19, 21, inlets 23, 25, 27, 29, 31, 33, outlets 35, 37, 39, 41, 43, 45, as well as channels for the guiding of fluids between the inlets, outlets, valves, pumps, sensors as well as between distribution elements and through them, respectively, wherein only exemplarily channels 47, 49 and 51 are denoted with reference numerals, to be explained more in detail in the following.

As to be gathered by comparing FIGS. 1 and 2 on the one hand and FIG. 3 on the other hand, the distribution elements 3 and 5 are formed plate-shaped and aligned parallel to each other. The connection of the distribution elements 3, 5 is thereby carried out by a first connection fixture, particularly welding, of the distribution elements 3, 5 produced from polypropylene in an ejection molding process.

Figure 5:
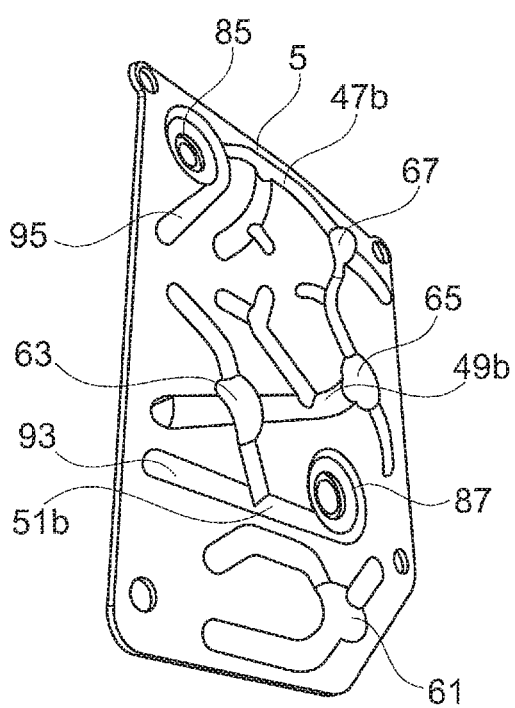
FIG. 5 a perspective view to a second distribution element of the apparatus of FIGS. 1 to 3.
Figure 4:
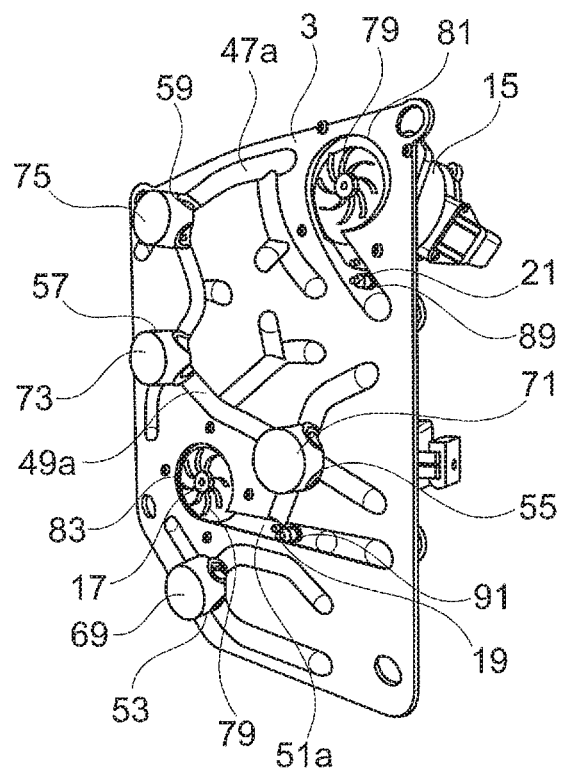
FIG. 4 a perspective view to the first distribution element of the apparatus of FIGS. 1 to 3 prior to a connection with the second distribution element.

In FIG. 4 the distribution element 3 is shown prior to its connection with the distribution element 5 depicted in FIG. 5. FIG. 4 further shows that different auxiliary elements further described in detail in the following are already aligned at the distribution element. As explained later on the basis of FIGS. 6a to 6d, these auxiliary elements can also be connected with the same after the connection with the distribution elements 3 and 5.

In FIGS. 1, 3, 4 and 5 it is recognizable that a part of the fluid handling elements is integrally formed with the distribution element 3. These particularly relate to the inlets 23 to 33 as well as to the outlets 35 to 45.

Further fluid handling elements are partly formed integrally with the distribution element 3 and the distribution element 5 and are fully formed regarding the connection of the distribution elements 3 and 5. This relates particularly to channels 47 to 51. These are formed in that the distribution elements are each forming channel half shells 47a and 47b, 49a, and 49b, as well as 51a and 51b, respectively, which complete themselves during the combination of the distribution elements 3 and 5 to channels. In some embodiments (not shown), sealing elements in the 2K process are formed in the region of the channel half shells during the production of the distribution elements 3 and 5.

Finally, module 1 has fluid handling elements that are only formed partly in the distributions element 3 and 5 and are only completed by the auxiliary elements that are connected to the distribution elements 3 and 5 and are partly led through the same, respectively, and/or are introduced into the same. This particularly refers to the valves 7 to 13, the pumps 15, 17 as well as the sensors 19, 21.

Hereby, the valves 7 to 13 comprise openings 53, 55, 57, 59 that are formed in the distribution element 3 as well as valve chambers 61, 63, 65, 67 that are formed in the distribution element 5. It can be particularly gathered from FIG. 4 and later be explained on the basis of FIGS. 6a to 6d, a valve member 69, 71, 73, 75 of an auxiliary element is introduced through each of the openings 53 to 59 in the respective valve chambers 61 to 67 and the auxiliary element is finally connected by a second connection fixture, particularly screwing or clipping with the distribution element 3 and/or 5. Thus, the respective valve 7 to 13 is formed.

In a similar manner, the pumps 15, 17 are formed. Hereby, a pump element, such as a rotor 77, 79, of a further auxiliary element is introduced in a respective opening 81, 83 in the distribution element 3. By connecting the auxiliary element with the distribution element 3 and 5, respectively, by a second connection fixture, for example screwing, each of the respective pumps 15, 17 is generated then in combination and interaction, respectively, with the pump chambers 85, 87 formed in the distribution element 5.

The respective sensors, particularly temperature sensors and pH sensors, respectively, are formed by the openings 89, 91 formed in the distribution element 3 and in the sensing chambers 93, 95 formed in the distribution element 5.

Figure 7:
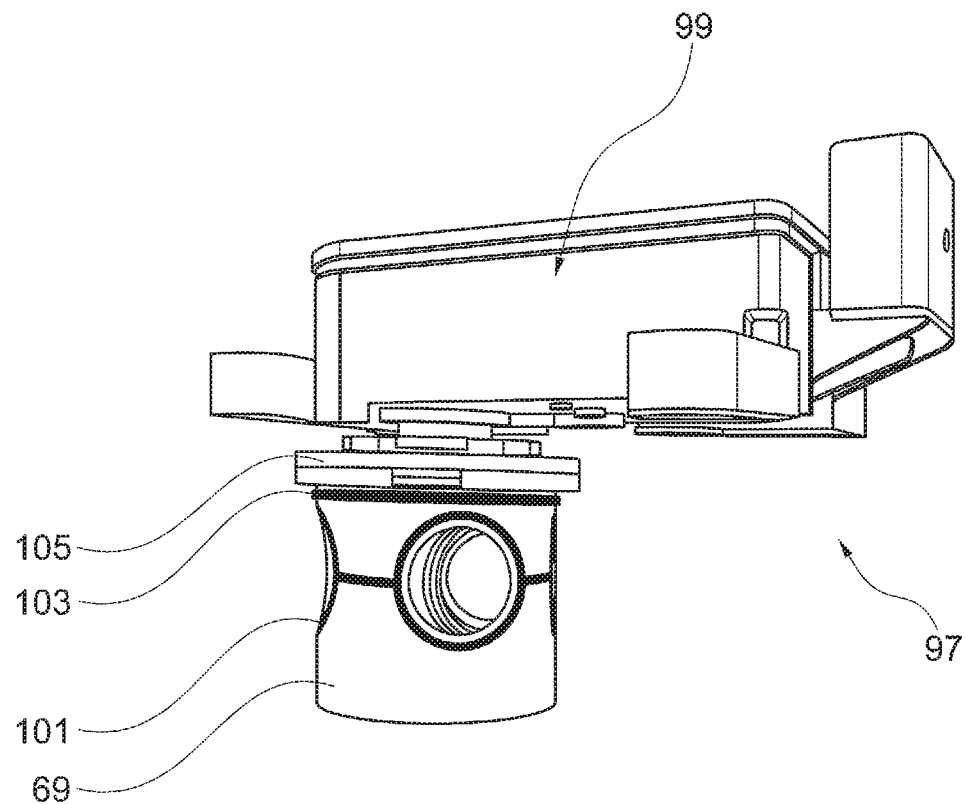
FIG. 7 a perspective view of the auxiliary element in the shape of valve component.

FIG. 7 shows a perspective view to an auxiliary element for the formation of the valve 13. The auxiliary element 97 comprises an electric actuator and (valve) actuator and drive 99, respectively, through which the valve member 69 is turnable. As further shown in FIG. 7, sealing elements 101, 103 are integrated in the valve member 69 in order to achieve a sealing in the valve chamber 61. Further, the auxiliary element comprises a connection element 105, which facilitates the connection with the distribution element 3 by a lock connection. As described before, a connection can be formed between the drive 99 and the valve member 69 in such a way that fluid is guided from the valve member 69 to the drive via a hollow shaft in order to cool the same. After the cooling, the fluid is guided again via a not depicted fluid lead into the respective distribution element 3, particularly by one of the inlets 23, 25, 27, 29, 31, 33. In addition, also a reversed guidance, that means through one of the outlets 35, 37, 39, 41, 43, 45 via a not depicted lead to the drive and from the same via the hollow shaft to the valve member 69 is possible. Further, this guidance of cool and/or heating fluids can also be transferred to other auxiliary elements as valves, such as pumps or such.

Figure 6A:
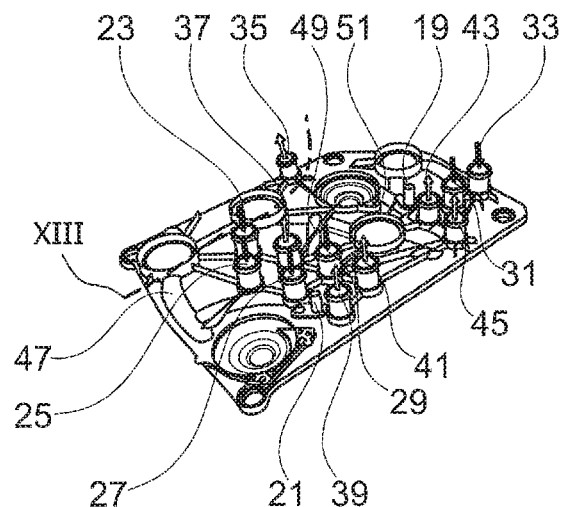
FIGS. 6a to 6d different stages of the connection of the distribution elements shown in FIGS. 1 to 5 with respective auxiliary elements.
Figure 6B:
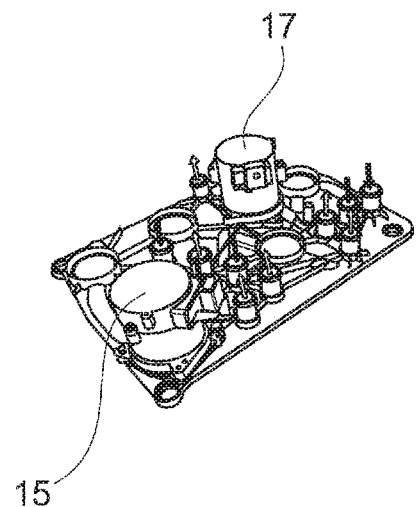
Figure 6C:
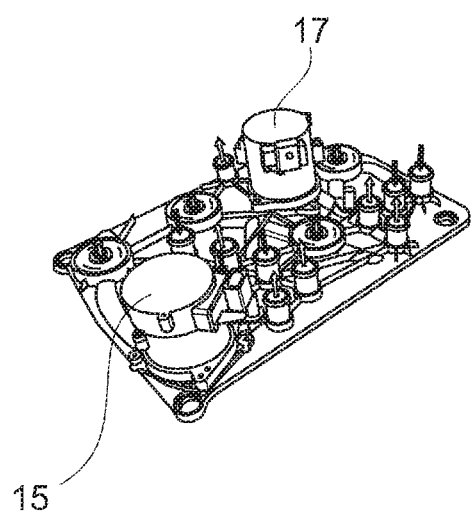
Figure 6D:
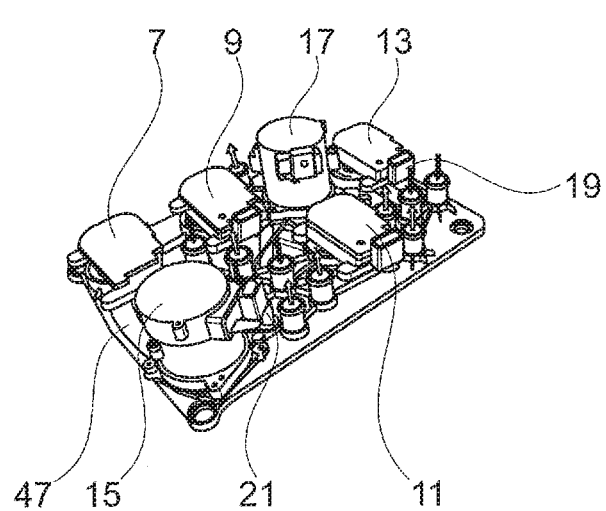

The assembly of the module 1 is now described on the basis of FIGS. 6a to 6d. As shown in FIG. 6a, at first the distribution elements 3 and 5 are provided and connected by welding and gluing, respectively. In a next step, which is shown in FIG. 6b, the auxiliary elements are mounted to the distribution element 3 for the formation of the pumps 15, 17 as well as sensors 19, 21 are introduced into the sensing chambers 93, 95 and connected to the distribution elements. In a next step, which is shown in FIG. 6c, which is shown in FIG. 6c, the valve members 69 to 75 are mounted in the valve chambers 61 to 67 by locking and are connected in a subsequent step, which is shown in FIG. 6d, the actuators of the valves 7 to 13 are connected to the valve numbers 69 to 75.

The thereby produced module can then be integrated as ZSB into the vehicle and only the respective inlets 23 to 33 and outlets 35 to 45 need to be connected to the tubings available in the vehicle. For example, the outlet 39 is connected with a cooling circuit in which the fluid is circulated by the pump 15. In this example, the outlet 41 is connected with a chiller while the inlet 33 is connected to a heat exchanger.

As particularly shown in FIG. 2, the set up of nodule 1 is not limited to the two levels and layers, respectively formed previously by the distribution elements 3 and 5. At the side of the distribution element 5 averted to the distributed element 3, covers 107, 109, 111 are arranged. It is possible without further ado to remove these covers and thereby open the fluid handling elements, which are shown in this example as channels and pump chambers, respectively, located beneath them in order to allow a connection to the third distribution element, a plurality of third distribution elements and thereby to add further levels and layers, respectively, in order to extend the functionality and complexity of the module 1.

FIGS. 8 to 11 show views of one embodiment of a (two-part) auxiliary element in the shape of a pump 113.

Figure 8:
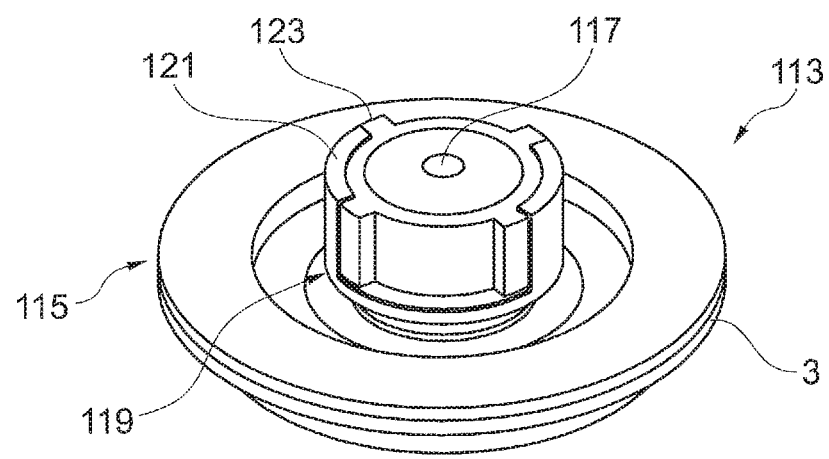
FIG. 8 a perspective view of a second part of an auxiliary element made up of two-parts.

FIG. 8 shows a perspective view to a second part 115 of the pump 113. As shown in FIG. 8, the second part 115 is connected to the first distribution element 3 that is only depicted section-wise via a lock connection that refers to a second connection fixture. FIG. 8 shows that a shaft 117 connects, as explained later, the drive of the pump with the pump member in the shape of a rotor in a region of a coupling fixture 119. The coupling fixture 119 has a claw-shaped coupling element 121 as well as a rubber elastic spring element 123 acting as a second damping element.

Figure 9:
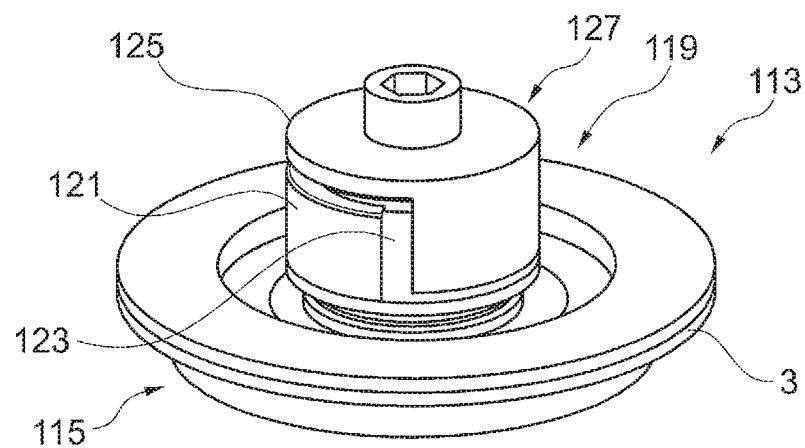
FIG. 9 a perspective view of the auxiliary element of FIG. 8 with a partly depicted first part of the auxiliary element.

FIG. 9 that depicts a further perspective view of the pump 113 shows how the first coupling element 121 interacts with a second coupling element 125 of the coupling fixture. The second coupling element is formed complementary to the first coupling element 121 and spring element 123. This complementary, also claw-shaped shape effectuates that the second coupling element 125 engages into the first coupling element 121 turn-carrier-safely. However, having no direct contact between the coupling elements 121 and 125 due to the arrangement of the spring element 123. Both of the coupling elements are thereby elastically mechanically connected to each other, wherein a force transmission is assured, while at the same time the formation of an acoustic bridge is inhibited. In other words, an acoustic decoupling is present between the same. It is thereby assured that impact sound generated by a drive of the pump 113, similar to the drive 99, that is not depicted in FIGS. 8 to 11, is transferred from the first part 127 to the second part 115 by the coupling fixture 119. Due to the direct mounting of the second part 115 to the distribution element 3, it is assured at the same time that the defined gap sizes are met. The first part 127 of the pump comprises a drive interacting with the coupling element 125, which is connected with the distribution element 3 acoustically decoupledly by a not depicted first damping element, wherein the indirect sound bridge to the distribution element 3 is inhibited.

Figure 10:
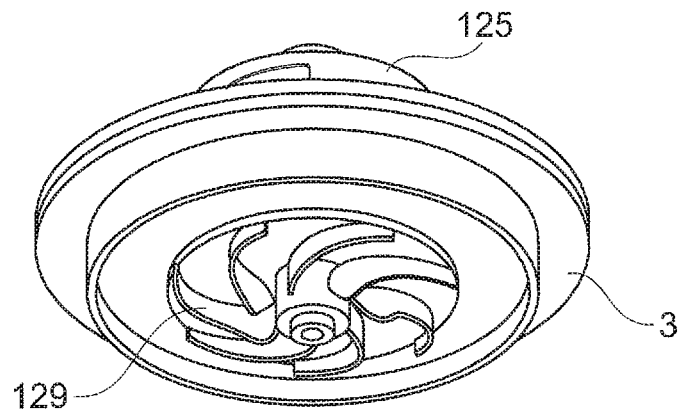
FIG. 10 a perspective bottom view of the auxiliary element of FIGS. 8 and 9.

FIG. 10 shows a perspective bottom view of a part of the pump 113. As shown in FIG. 10, the shaft 117 and the coupling element 121 is connected with the rotor 129. Due to the direct mounting of the second part 115 at the distribution element 3, the rotor is arranged in a defined position relative to the first distribution element, through which the same is protruding, and relative to a pump chamber formed in the second distribution element 5, the pump chamber not being depicted in FIGS. 8 to 11.

Figure 11:
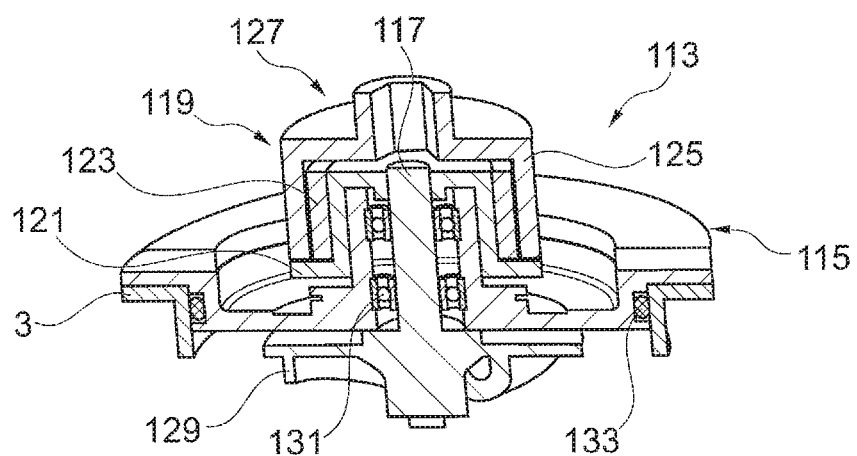
FIG. 11 a cross-section view of the auxiliary element of FIGS. 8 to 10.

FIG. 11 shows a cross-section view of a part of the auxiliary element in the shape of a pump 113. The second part 115 is connected with the first distribution element 3 via a lock connection and the opening in the first distribution element 3 and thereby the pump chamber following up the same being sealed by seals 133. FIG. 10 further shows that the shaft 117 is supported by bearings 131. The use of the coupling fixture 119 causes that less vibrations are transferred to the shaft 117 and thereby an impact sound transfer via the bearing 131 and the overload of the bearing 133, respectively, is avoided.

Figure 12:
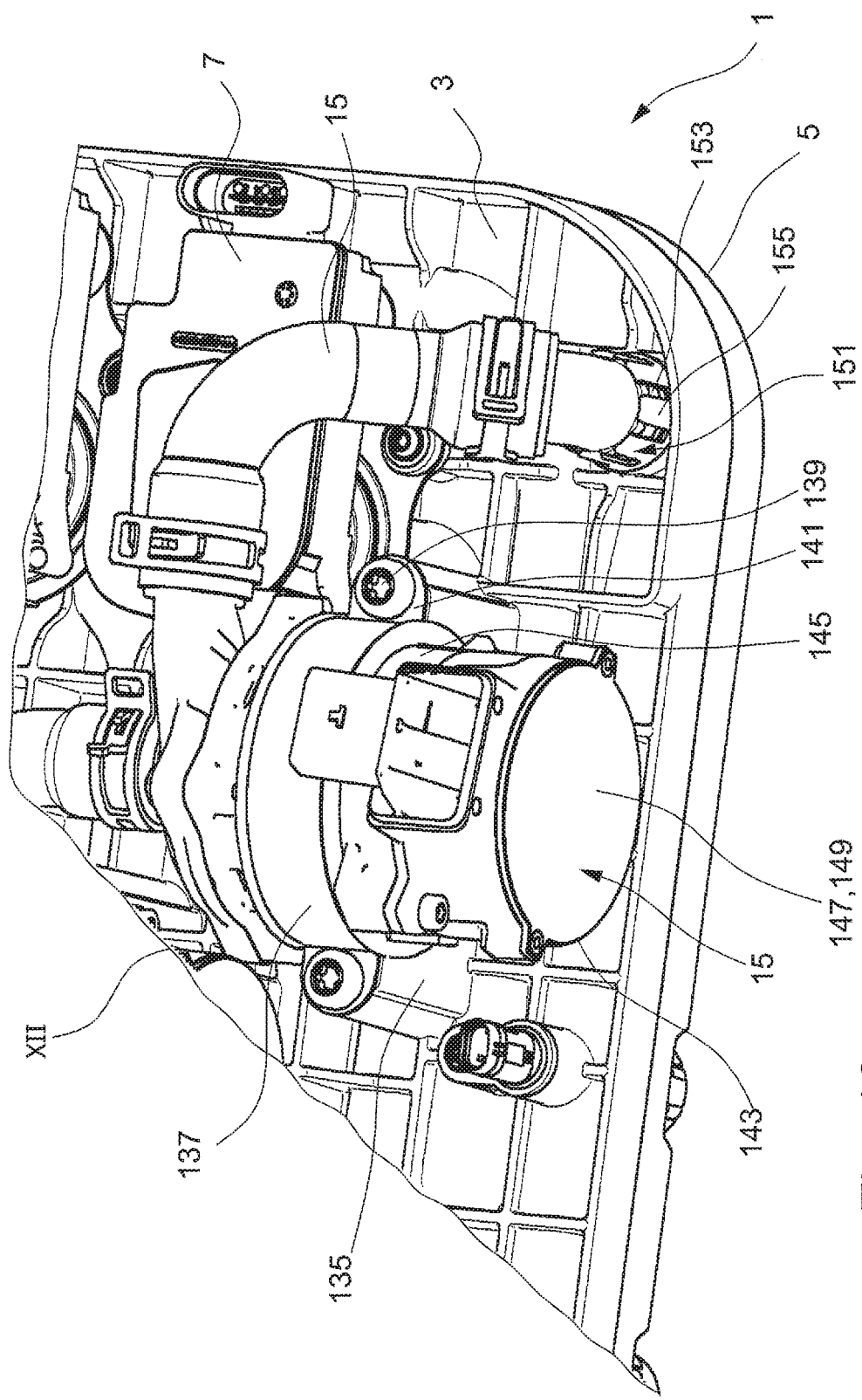
FIG. 12 a perspective view of a detail of an upper side of the apparatus according to a further exemplary embodiment.

FIG. 12 shows a perspective view of a detail (according to the line XII in FIG. 1) of an upper side of a further exemplary embodiment of the apparatus. The following description hereby limits itself to the essential differences resulting in the comparison to the previous exemplary embodiments. The distribution element 3 comprises a particularly pitch circle-shaped recess 135, such as a pan, formed at its surface, for receiving at least a part of the pump 15. The pump 15 comprises an essentially cylindrical pump housing 143 comprising a housing sheath 145 and two housing front walls 147, 149 opposing each other and delimiting the housing sheath 145. According to the embodiment shown in FIG. 12, the pump 15 is arranged, different than in the previous embodiments, in which the pump is mounted essentially standingly, that means with one of the housing front walls 147, 149 being mounted on the distribution element 3, lyingly on the valve element 3. The pump 15 lies on the distribution element 3 by the housing sheath 145 and particularly on the pitch circle-shaped recess 135. The mounting of the pump 15 at the distribution element 3 is realized according to FIG. 12 by a clamp 137. The clamp 137 encompasses the pump at least partly around a circumference and is mounted to the distribution element 3, by a screwing 139. In order to realize the screwing 139, the clamp 137 has at least one mounting lug 141, such as two mounting lugs 141.

Furthermore, FIG. 12 shows that a connection nozzle 151, which can for example be an inlet 23, 25, 27, 29, 31, 33 or an outlet 35, 37, 39, 41, 43, 45, can be formed for the connection with a respective component, a fluid handling element, for example a tube 157, in such a way that an assembly direction and/or orientation is predetermined for the coupling with a further component. For example, a coupling fixture, such as a female coupling part 153 has a connection nozzle 151, which is formed to get engaged with a respective coupling fixture, such as a male coupling part, which is to be mounted at the further component to be coupled, or vice-versa, wherein the coupling fixture of the connection nozzle 151 defines a predetermined assembly direction and/or orientation, in which the component is couplable. In particular, the coupling parts 153, 155 of the connection nozzles and components can be brought into engagement to each other only in the predetermined assembly direction and/or orientation to each other. For the case that several connection nozzles 151 are arranged at the distribution elements 3, 5 for several components, the coupling parts can be formed in such a way that an unambiguous assignment of the coupling parts 153, 155 to be mounted to each other is possible, that means a respective coupling part pair is determinable unambiguously. In particular, the risk of a faulty assembly can be reduced significantly, or even avoided. For example, the female coupling part 153 is realized as recess and the male coupling part 155 as elevation. When coupling a further component having a respective mounting unit, the respective male coupling parts engage in the female coupling parts 153 and respective female coupling parts in the male coupling parts 155.

Figure 13:
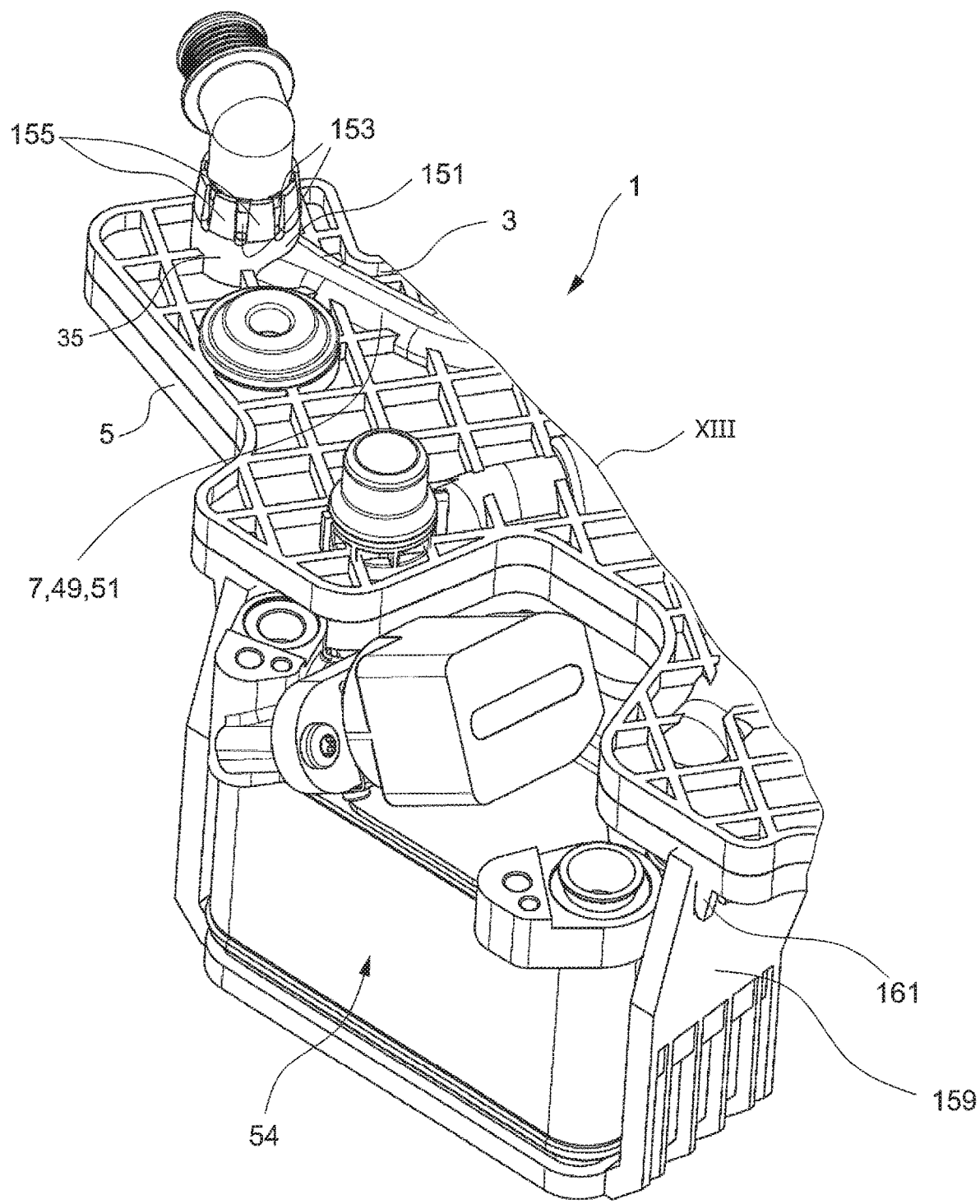
FIG. 13 a perspective view of a detail of an upper side of an apparatus according to a further exemplary embodiment.
Figure 14:
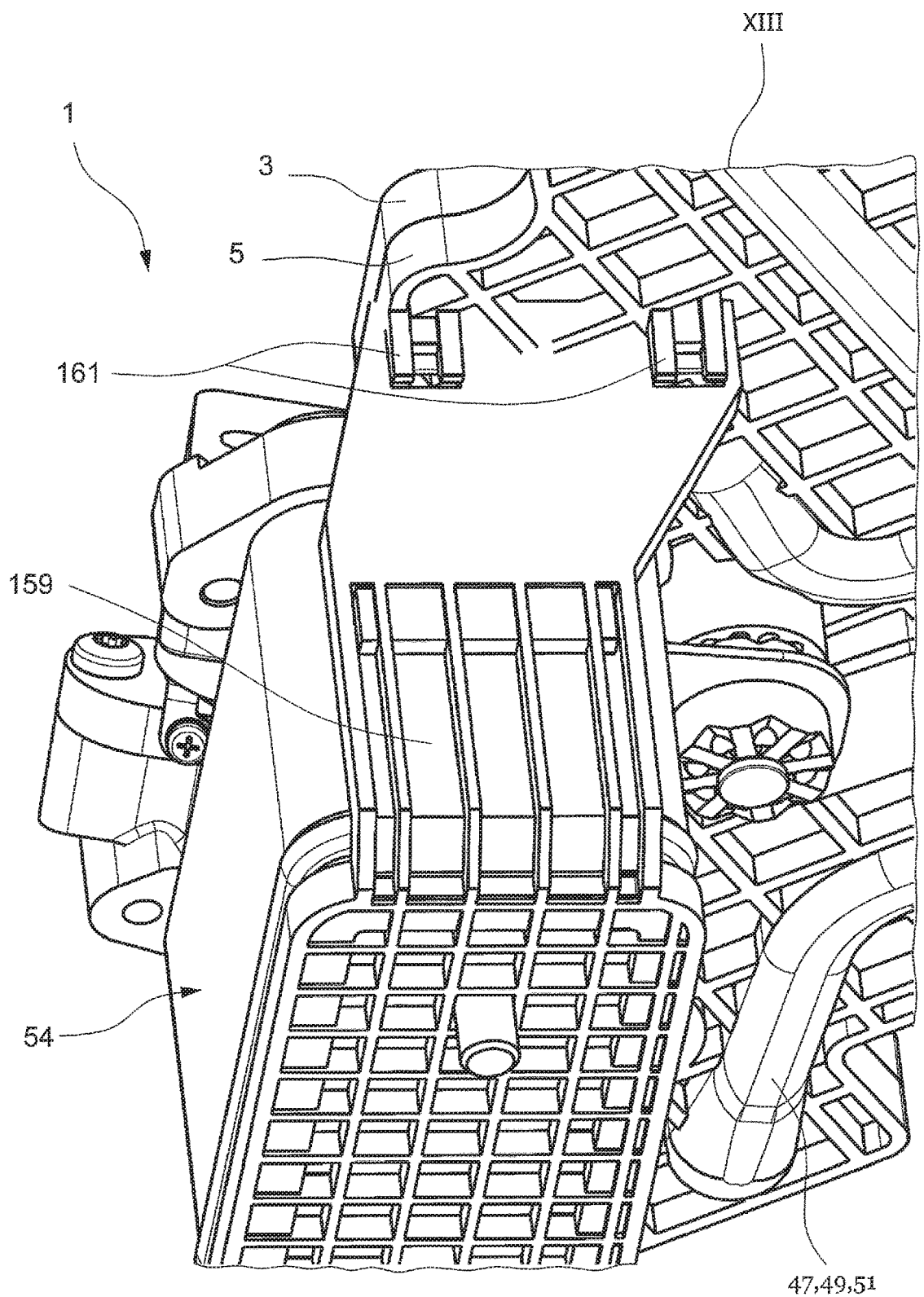
FIG. 14 a perspective view of a detail of the bottom side of the apparatus according to FIG. 13.

FIGS. 13 and 14 show a further exemplary embodiment of the apparatus 1 according to one embodiment, wherein FIG. 13 shows a perspective view of a detail (according to the line XIII in FIG. 6a) of an upper side of the apparatus 1 and FIG. 14 a perspective view of a detail (according to the line XIII in FIG. 6a) a bottom side of the apparatus 1. The following description limits itself to the essential differences resulting from the comparison to the previous exemplary embodiments. According to FIGS. 13 and 14, at least one fluid handling element is a coolant-coolant heat transfer unit 154, the so-called Chiller. The same can for example be coupled to the distribution element 5 by for example a U-shaped profile 159 made of plastics. For example, the coupling can take place form-fittingly, such as by locking, by screwing or firmly bondedly, such as by gluing or welding. The mounting profile 159 can have at least one locking element (not depicted) at its distribution element side that is configured to get into engagement with this attributed locking part 161 of the distribution element 5 in order to mount the coolant-coolant heat transfer unit 154 by the mounting profile 159 at the distribution element 5.

In a perspective bottom view to the apparatus 1, particularly the distribution element 5, according to FIG. 14, especially the mounting of the coolant-coolant heat transfer unit 154 and the distribution element 5 are depicted in detail. Locking elements 161 arranged in pairs are provided at the bottom side of the distribution element 5, wherein only one locking part pair 161 is visible. One locking element pair (not depicted) of the mounting profile 159 can get into engagement with each of one locking part pair 161 in order to mount the coolant-coolant heat transfer unit 154 and the mounting profile 159 to the distribution element 5.

The coupling fixture can be formed, as previously noticed, in not depicted embodiments also as contactless coupling fixtures.

The inlets and outlets are arranged in the previous examples at the upper side and bottom side, respectively, of the distribution element. Self-evidently, the same can also be arranged partly at the front sides of the distribution elements 3, 5.

The features disclosed in the description, in the claims and in the drawings can be essential for the invention in its different embodiments, both individually and in arbitrary combination.

LIST OF REFERENCE NUMERALS 1 module
3, 5 distribution element
7, 9, 11, 13 valve
15, 17 pump
19, 21 sensor
23, 25, 27, 29, 31, 33 inlet
35, 37, 39, 41, 43, 45 outlet
47, 49, 51 channel
47a, 47b, 49a, 49b, 51a, 51b channel half shell
54 coolant-coolant heat transfer unit
53, 55, 57, 59 opening
61, 63, 65, 67 valve chamber
69, 71, 73, 75 valve member
77, 79 rotor
81, 83 opening
85, 87 pump chamber
89, 91 opening
93, 95 sensing chamber
97 auxiliary element
99 actuator
101, 103 sealing element
105 connection element
107, 109, 111 cover
113 pump
115 part
117 shaft
119 coupling fixture
121 coupling element
123 spring element
126 coupling element
127 part
129 rotor
131 bearing
133 sealing
135 pan
137 clamp
139 screwing
141 lug
143 pump housing
145 housing sheath
147, 149 housing front wall
151 connection nozzle
153 female coupling part
155 male coupling part
157 tube
159 mounting profile
161 locking part
A direction

We claim:
1. An apparatus for the handling of at least one fluid in a vehicle comprising:
at least one essentially plate-shaped formed first distribution element and at least one second distribution element arranged essentially parallel to the first distribution element; and
a plurality of fluid handling elements, wherein:
the first distribution element comprises at least one first fluid handling element of the plurality of fluid handling elements, and the second distribution element comprises at least one second fluid handling element of the plurality of fluid handling elements, the at least one first fluid handling element and the at least one second fluid handling element being at least one valve, at least one pump, or at least one sensor;

the first distribution element and the second distribution element are formed of one or more plastics;

the at least one first fluid handling element and the at least one second fluid handling element are respectively encompassed by the first distribution element and the second distribution element;

at least a part of the at least one first fluid handling element and at least a part of the at least one second fluid handling element are integral components in the first distribution element and the second distribution element, respectively, and in a shape of at least one recess and at least one chamber, the at least one chamber including at least one valve chamber, at least one pump chamber, at least one channel segment, at least one sensing chamber or at least one sample chamber; and the plurality of fluid handling elements comprises at least one auxiliary element connectable in the recess and the chamber to the first distribution element or the second distribution element, the at least one auxiliary element including a valve actuator, a pump actuator, a valve member, a pump element, or a sensor.

2. The apparatus according to claim 1, comprising:
at least one third distribution element, wherein the at least one third distribution element is arranged essentially parallel to the first distribution element or the second distribution element, wherein the at least one third distribution element comprises at least one fluid handling element of the plurality of fluid handling elements.

3. The apparatus according to claim 1, wherein another of the plurality of the fluid handling elements comprise at least one opening, at least one connection nozzle shaped as at least one inlet and at least one outlet, at least one valve, at least one pump, at least one channel, at least one sensor, or at least one sealing element.

4. The apparatus according to claim 3, wherein:
the connection nozzle has a coupling fixture that is formed to engage with a respective coupling fixture of a fluid handling element to be coupled;
the coupling fixture of the connection nozzle defines a predetermined assembly direction and orientation, in which the fluid handling element is connectable to; and
the coupling parts of connection nozzle and fluid handling element can be brought into engagement with each other in the predetermined assembly direction and orientation.

5. The apparatus according to according to claim 1, wherein the sensor comprises a temperature sensor, a pH sensor, a pressure sensor, or a flow sensor.

6. The apparatus according to claim 1, wherein at least a region of the auxiliary element is acoustically uncoupled or acoustically damped from the first distribution element and the second distribution element, and supported with interposing at least one acoustic first damping element to the first distribution element or the second distribution element.

7. The apparatus according to claim 6, wherein the auxiliary element is built up at least in two parts, a first part of the auxiliary element being supported acoustically decoupled or acoustically damped from the first distribution element or the second distribution element, and wherein a second part of the auxiliary element is connected to the first distribution element or the second distribution element at least indirectly acoustically undamped.

8. The apparatus according to claim 7, wherein the first part comprises: at least one drive, at least one actuator, at least one analysis unit or transducer unit of a sensor, the transducer unit being adapted to convert a sensing signal captured by a sensing unit of the sensor into a measurement signal output by the sensor.

9. The apparatus according to claim 8, wherein the second part comprises at least one driven member that is driven by the first part, the at least one driven member including a pump member, a valve member, or at least a sensing unit of the sensor and configured to interact with the analysis unit or the transducer unit.

10. The apparatus according to claim 9, wherein a translational force or a torque is transferrable by at least one coupling fixture from at least one region of the first part to at least one region of the second part; and wherein the sensing is at least partly coupled from the at least one region of the first part to the at least one region of the second part by electromagnetic, magnetic, elastic mechanical, direct mechanical, indirect or optical coupling.

11. The apparatus according to claim 10, wherein the coupling fixture comprises at least one magnet or at least one second damping element, the coupling fixture being permeable for the fluid handled by the apparatus to guide the fluid from the second part to the first part or from the first part to the second part.

12. The apparatus according to claim 11, wherein the first damping element and the second damping element comprises at least one elastic element.

13. The apparatus according to claim 12, wherein the at least one fluid handling element is formed at least partially by a combination of the first distribution element or the second distribution element.

14. The apparatus according to claim 2, wherein the first distribution element and the second distribution element, the first distribution element and the third distribution element, the second distribution element and the third distribution element, or at least two third distribution elements, are connected to each other by at least one first connection fixture.

15. The apparatus according to claim 2, wherein the at least one auxiliary element is connected to the first distribution element, the second distribution element, or the third distribution element at least region-wisely by at least one segment connection fixture.

16. The apparatus according to claim 15, wherein the at least one segment connection fixture comprises at least one welding connection, at least one adhesion connection, at least one screw connection, at least one lock connection, or at least one clip connection.

17. The apparatus according to claim 16, wherein the first part of the at least one auxiliary element is connected by a first segment connection fixture and the second part of the at least one auxiliary element is connected by a second segment connection fixture.

18. The apparatus according to claim 17, wherein the first second connection fixture comprises a damping element.

19. The apparatus according to claim 2, wherein the first distribution element, the second distribution element, and the third distribution element, comprises a thermoplastic material, a duroplastic material, a compound material, at least one polypropylene material, or at least one polyamide material.

20. The apparatus according to claim 1, wherein the fluid comprises at least one cooling liquid.

21. The apparatus according to claim 20, wherein a fluid handling element is formed as a coolant-coolant heat transfer unit that is mounted detachably to one of the first and the second distribution elements, and wherein the coolant-coolant heat transfer unit is mounted form-fittingly with an essentially U-shaped profile.

22. A method for the production of an apparatus for handling of at least one fluid, the method comprising:
   providing plurality of fluid handling elements;
   providing at least one first, essentially plate-shaped distribution element, the first distribution element including at least one first fluid handling element of the plurality of fluid handling elements;
   providing at least one second, essentially plate-shaped distribution element, the second distribution element including at least one second fluid handling element of the plurality of fluid handling elements, wherein:
      the at least one first fluid handling element and the at least one second fluid handling element are at least one valve, at least one pump, or at least one sensor;
      the at least one first fluid handling element and the at least one second fluid handling element are respectively encompassed by the first distribution element and the second distribution element;
      at least a part of the at least one first fluid handling element and at least a part of the at least one second fluid handling element are integral components in the first distribution element and the second distribution element, respectively, and in a shape of at least one recess and at least one chamber, the at least one chamber including at least one valve chamber, at least one pump chamber, at least one channel segment, at least one sensing chamber or at least one sample chamber; and
      the plurality of fluid handling elements comprises at least one auxiliary element connectable in the recess and the chamber to the first distribution element or the second distribution element, the at least one auxiliary element including a valve actuator, a pump actuator, a valve member, a pump element, or a sensor; and
   connecting the first distribution element with the second distribution element by at least one connection fixture.

23. The method according to claim 22, comprising: providing at least one third, essentially plate-shaped distribution element, wherein the at least one third distribution element is connected to the first distribution element, the second distribution element or at least one further third distribution element by the first connection fixture.

24. The method according to claim 23, wherein the providing the first distribution element, providing the second distribution element, and providing the third distribution element comprises producing the first distribution element, the second distribution element, and/or the third distribution element in at least one open/close tool, by injection molding.

25. The method according to claim 24, wherein the providing the first distribution element, providing the second distribution element, and providing the third distribution element comprises the at least partial formation of at least one fluid handling element in the first distribution element, the second distribution element, and the third distribution element.

26. A thermo-management module for the handling of at least one fluid in a vehicle, comprising:
   at least one essentially plate-shaped formed first distribution element and at least one second distribution element arranged essentially parallel to the first distribution element, wherein:
   the first distribution element and the second distribution element comprise at least one fluid handling element;
   the first distribution element and the second distribution element are formed of one or more plastics;
   the at least one first fluid handling element and the at least one second fluid handling element are respectively encompassed by the first distribution element and the second distribution element;
   at least a part of the at least one first fluid handling element and at least a part of the at least one second fluid handling element are integral components in the first distribution element and the second distribution element, respectively, and in a shape of at least one recess and at least one chamber, the at least one chamber including at least one valve chamber, at least one pump chamber, at least one channel segment, at least one sensing chamber or at least one sample chamber; and
   the plurality of fluid handling elements comprises at least one auxiliary element connectable in the recess and the chamber to the first distribution element or the second distribution element, the at least one auxiliary element including a valve actuator, a pump actuator, a valve member, a pump element, or a sensor.

* * * * *